May 19, 1964  G. R. ENGLUND ETAL  3,133,697
DATA HANDLING APPARATUS
Filed April 18, 1960  14 Sheets-Sheet 1

INVENTORS
GÖSTA R. ENGLUND
STEN A. UNGMAN
BY
Mason, Kolehmainen, Rathburn and Wyss.
ATTORNEYS May 19, 1964 G. R. ENGLUND ETAL 3,133,697
DATA HANDLING APPARATUS
Filed April 18, 1960 14 Sheets-Sheet 3

INVENTORS
GÖSTA R. ENGLUND
STEN A. UNGMAN
BY
Mason, Kolehmainen, Rathburn and Wyss
ATTORNEYS

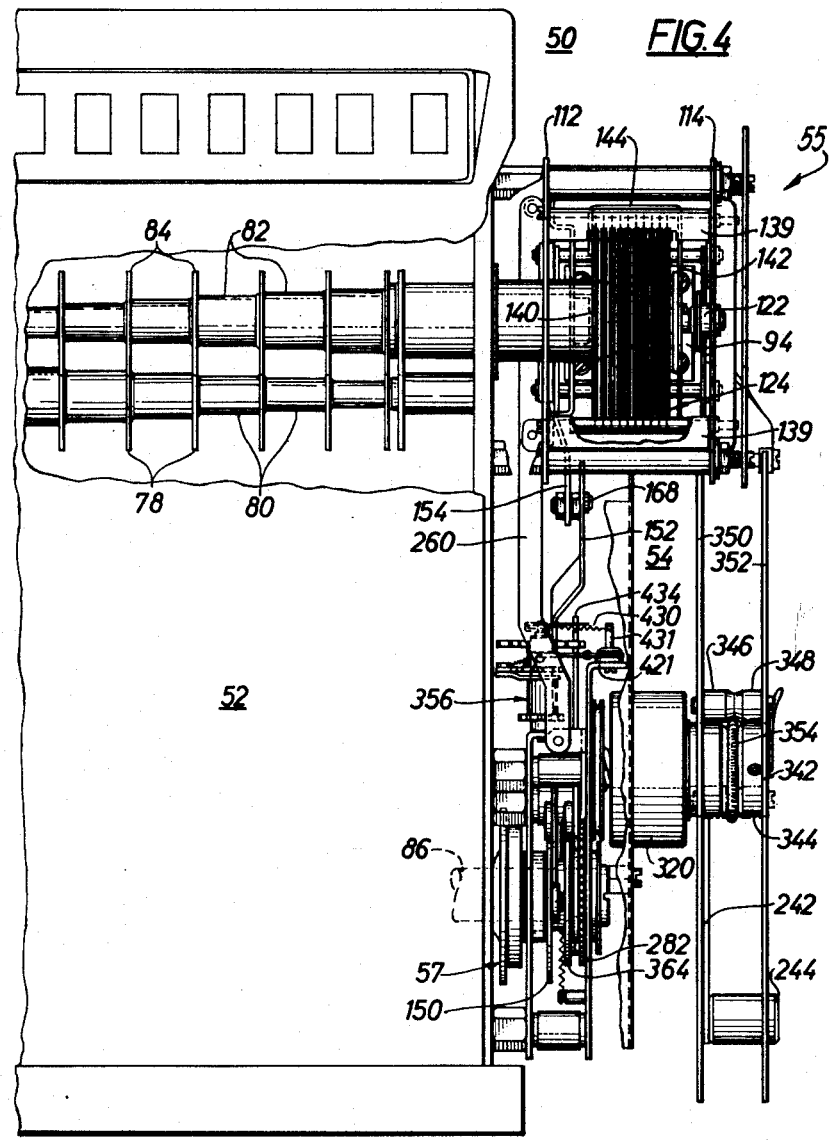

May 19, 1964
G. R. ENGLUND ETAL
3,133,697
DATA HANDLING APPARATUS
Filed April 18, 1960
14 Sheets-Sheet 5
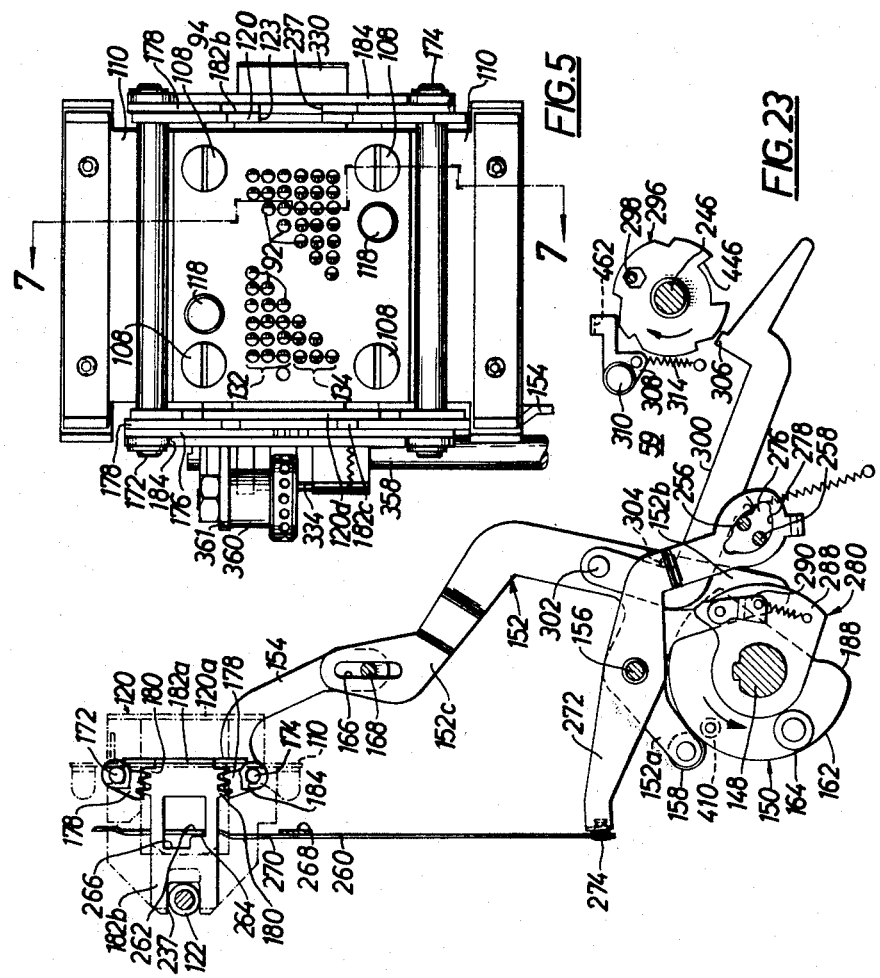
INVENTORS
GÖSTA R. ENGLUND
STEN A. UNGMAN
BY
*Mason, Kolehmainen, Rathburn and Wyss*
ATTORNEYS

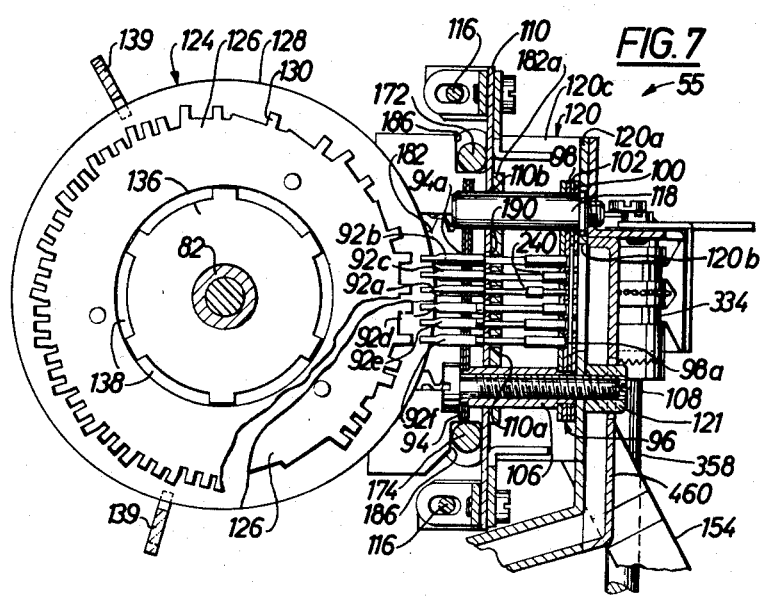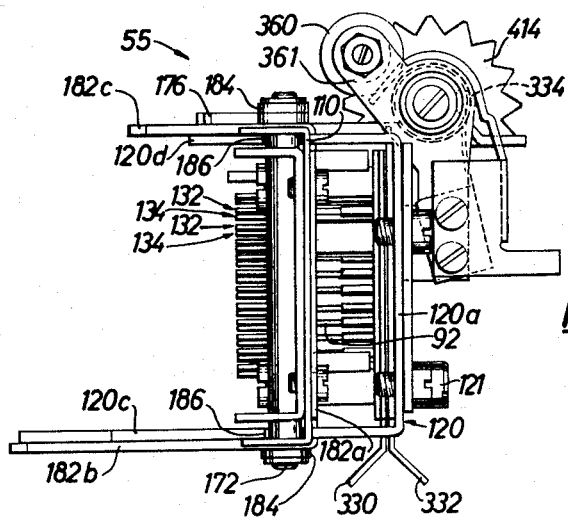

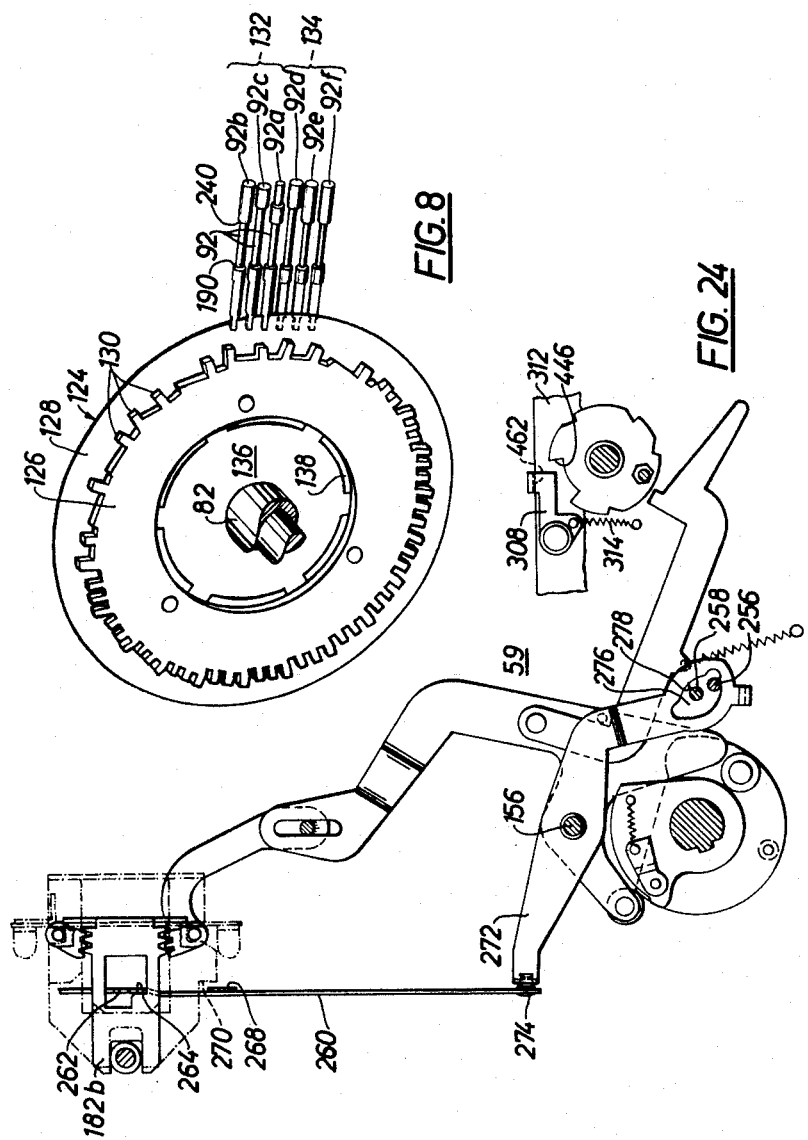

INVENTORS
GÖSTA R. ENGLUND
STEN A. UNGMAN
BY
ATTORNEYS

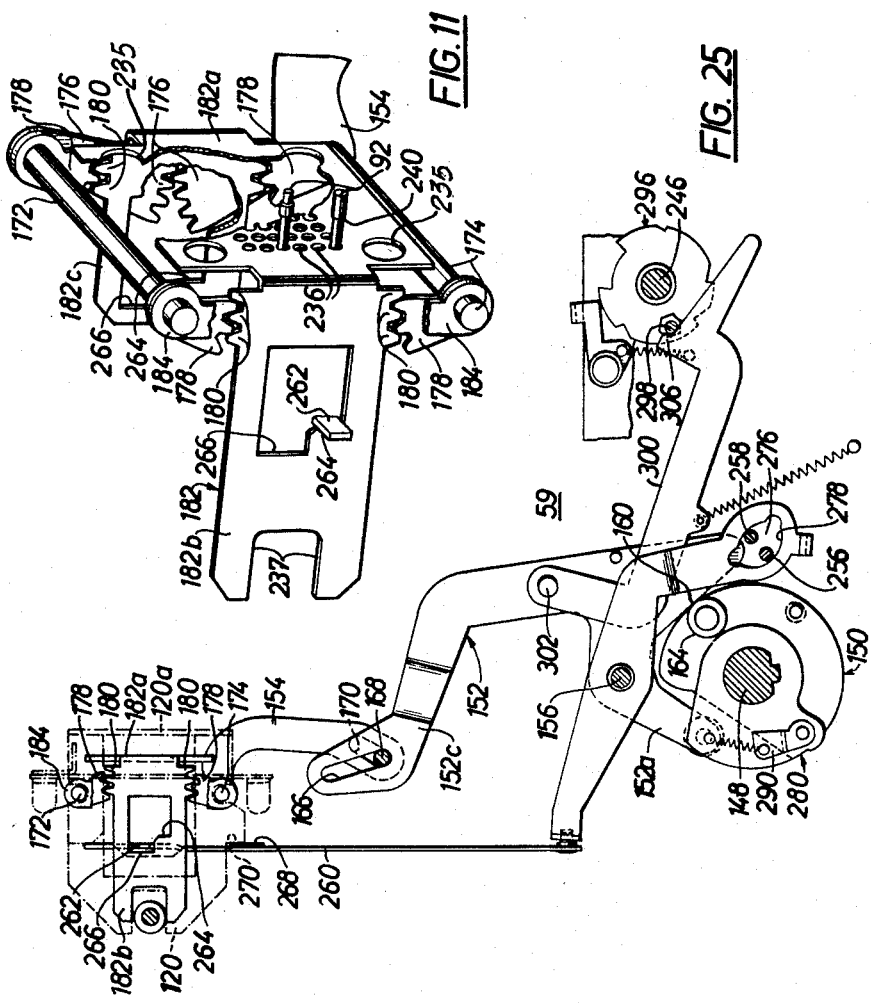

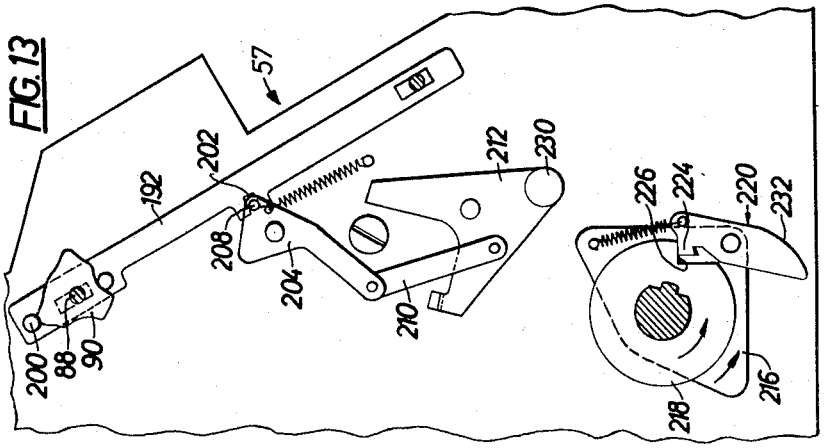
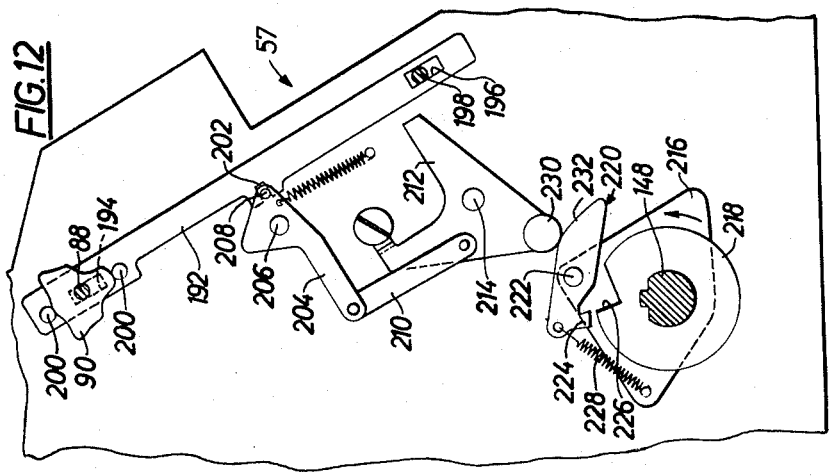

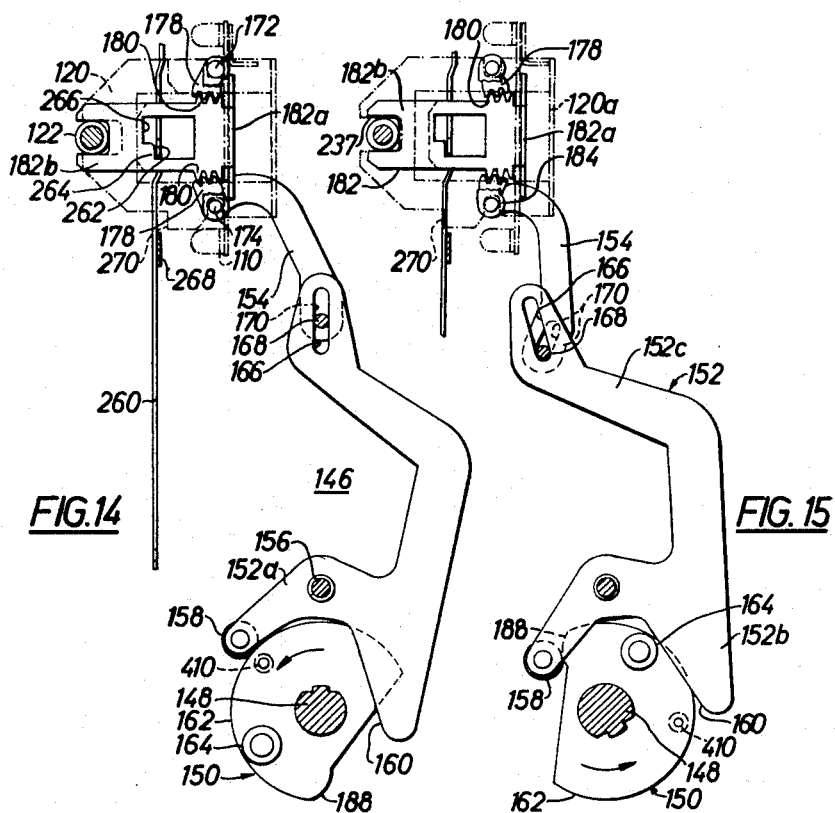

May 19, 1964 G. R. ENGLUND ETAL 3,133,697
DATA HANDLING APPARATUS

Filed April 18, 1960 14 Sheets-Sheet 12

INVENTORS
GÖSTA R. ENGLUND
STEN A. UNGMAN
BY
Mason, Kolehmainen, Rathburn and Wyss
ATTORNEYS May 19, 1964  G. R. ENGLUND ETAL  3,133,697
DATA HANDLING APPARATUS Filed April 18, 1960  14 Sheets-Sheet 13

INVENTORS
GÖSTA R. ENGLUND
STEN A. UNGMAN
BY
ATTORNEYS

May 19, 1964  G. R. ENGLUND ETAL  3,133,697
DATA HANDLING APPARATUS
Filed April 18, 1960  14 Sheets-Sheet 14
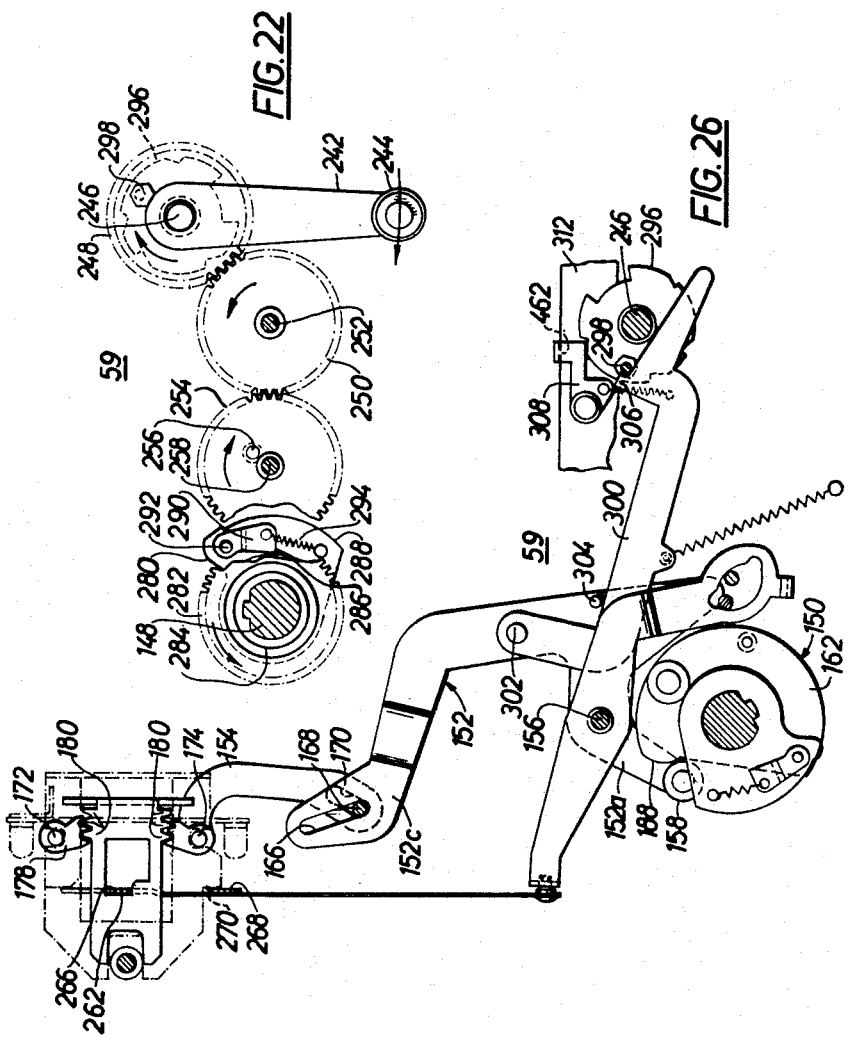
INVENTORS
GÖSTA R. ENGLUND
STEN A. UNGMAN
BY
Mason, Kolehmainen, Rathburn and Wyss
ATTORNEYS United States Patent Office 3,133,697
Patented May 19, 1964

3,133,697
DATA HANDLING APPARATUS
Gosta R. Englund, Stockholm, and Sten A. Ungman, Solna, Sweden, assignors to Svenska Dataregister AB., Stockholm, Sweden, a corporation of Sweden
Filed Apr. 18, 1960, Ser. No. 22,777
27 Claims. (Cl. 234—54)

This invention relates to data handling apparatus and, more particularly, to an accounting machine including new and improved means for automatically storing data on a record medium.

In recent years, it has become increasingly necessary for large department stores, chain stores, and similar retail and wholesale establishments to maintain continuous sales and inventory records from which it is possible to quickly determine such information as the volume of a preceding day's sales and the amount of stock or inventory on hand at any given time. Although this information can easily be provided by conventional data processing or accounting equipment, the preparation of input records in a suitable coded form for use in the data processing equipment often results in undesirable delays and errors because of the necessity of translating original sales and inventory records into coded records for use in the accounting equipment.

The deficiencies of this manually controlled transcription or translation of information from original records to input records for the accounting equipment can be overcome by directly producing records in the proper machine code at the time of making the original record at, for instance, the point of sale. As an example, equipment such as cash registers used at the point of sale has been modified to provide electrical output signals corresponding to various desired items of data, and these signals are applied to a separate recording instrument, such as a tape or card perforator, that produces an original record in a form suitable for direct insertion into conventional accounting equipment. However, these proposals not only require the modification of existing equipment, such as cash registers, but also involve the additional cost of providing separate recording units. In addition, in large establishments using a large number of primary record producing units, it is desirable to include an entry on the record medium designating the source from which the primary record was obtained.

Accordingly, one object of the present invention is to provide a new and improved data handling apparatus.

Another object is to provide a data processing unit including new and improved means for recording data in permanent form.

Another object is to provide a data handling apparatus, such as a cash register, including new and improved means for not only recording data entered into the cash register, but also the results of arithmetical operations performed by the cash register.

A further object is to provide data handling apparatus including means for automatically recording fixed items of information, such as the identity of the apparatus, on the output record.

A further object is to provide a cash register including new and improved means for producing a punched or perforated output record.

Another object of this invention is to provide a perforating device which simultaneously punches a record medium with one or more fixed items of information in response to the insertion of the record medium into the perforating device.

A further object is to provide a cash register including perforating means that are selectively rendered effective to record various items of information on a record medium in accordance with the mode of operation performed by the cash register.

Another object is to provide a perforating mechanism including improved, differentially adjustable means for controlling a plurality of punching elements.

In accordance with these and many other objects, an embodiment of the present invention comprises a data processing machine or cash register including a tape perforating unit that is automatically operable to record both data entered into and the results of arithmetical operations performed by the cash register in dependence on the mode or type of operation for which the cash register has been conditioned. The perforating unit also includes an assembly by which certain fixed items of information, such as the identity of the cash register, are automatically recorded on the record medium when the tape is inserted into or removed from the perforating unit.

To provide means for automatically recording data entered into the cash register and the results of arithmetical operations performed by the register, the perforating unit including a plurality of code disc units that are individually rotated to different digit representing positions under the control of differentially settable elements in the cash register. Each of the code disc units consists of a pair of code discs which are positioned on opposite sides of a guide plate and which individually include an outer surface formed with a pattern of projections representing coded digital information. The two code discs in each of the code disc units are aligned with the offset ends of a corresponding row of punch elements or pins.

When a data entry from the cash register is to be recorded in a paper tape or audit strip, the code disc units are set to digit representing positions by the cash register in which each pair of code discs presents a particular pattern of recessed and projecting portions to the associated row of pins corresponding to the coded representation of the digit to be recorded. When relative movement is produced between the code discs and the punching pins, a particular pattern of the punches in each row thereof is actuated to punch a pattern of apertures in the paper tape providing a coded representation of the digit to be recorded. Since each single row of punch elements is actuated by two parallel code discs, the angular separation between successive settings of the code disc units necessary to provide distinct digit representing codes on the audit strip is materially reduced.

To provide means for permitting the perforating unit to record only selected items of information or items occurring during selected types of operation of the cash register, the perforating unit includes a selector control that is responsive to the setting of the differential element in the cash register which represents the mode of operation for which the cash register has been conditioned. This selector control renders the drive for producing relative movement between the code disc units and the punching pins effective or ineffective in accordance with the mode of operation for which the cash register has been conditioned.

To provide the manually actuated means for automatically recording fixed information on the paper tape during the insertion of the tape into or the removal of the tape from the perforating means, those of the punching elements or pins corresponding to a coded representation of the fixed item of information are provided with control or elongated portions. When a manually actuated mechanism for advancing the paper tape is actuated, as during the insertion or removal of the tape, only the punching elements having elongated or control portions are actuated to perforate the fixed items of information into the paper tape.

Many other objects and advantages of the present invention will become apparent from considering the following detailed description in conjunction with the accompanying drawings in which:

FIG. 4 is a rear elevational view of the cash register shown in FIG. 1 with portions of a housing removed to illustrate the perforator;

FIG. 5 is a rear elevational view of a punching unit forming a part of the improved perforator;

FIG. 6 is a top plan view of the punching unit shown in FIG. 5;

FIG. 7 is an enlarged sectional view of the punching unit taken along line 7—7 in FIG. 5 which also illustrates a code disc unit for controlling the punching unit;

FIG. 8 is a perspective view of one code disc unit and a cooperating set of punching elements or pins;

FIG. 11 is a perspective view illustrating a manually actuated yoke for operating the punching unit;

FIG. 12 is an elevational view illustrating the ineffective position of a selector means for coupling a driving means in the cash register to a driving means for the perforator;

FIG. 13 is an elevational view similar to FIG. 12 illustrating the selector means in an effective position in which the perforator can be driven by the cash register;

FIG. 14 is a side elevational view showing the normal position of a drive mechanism actuated by the cash register for operating the punching unit;

FIG. 15 is a side elevational view similar to FIG. 14 showing the drive means in an actuated position;

FIG. 22 is an elevational view of a gear train in a manually actuated drive means for the perforator;

FIG. 23 is a side elevational view of the manually actuated drive means for operating the perforator, which drive means is shown in a normal position;

FIG. 24 is a side elevational view similar to FIG. 23 showing the manually actuated drive means in a partially operated condition;

FIG. 25 is a side elevational view similar to FIG. 23 showing the manually actuated drive means in a position just before a punching operation; and FIG. 26 is a side elevational view similar to FIG. 23 illustrating the manually actuated drive means in a punching position.

Figure 1:
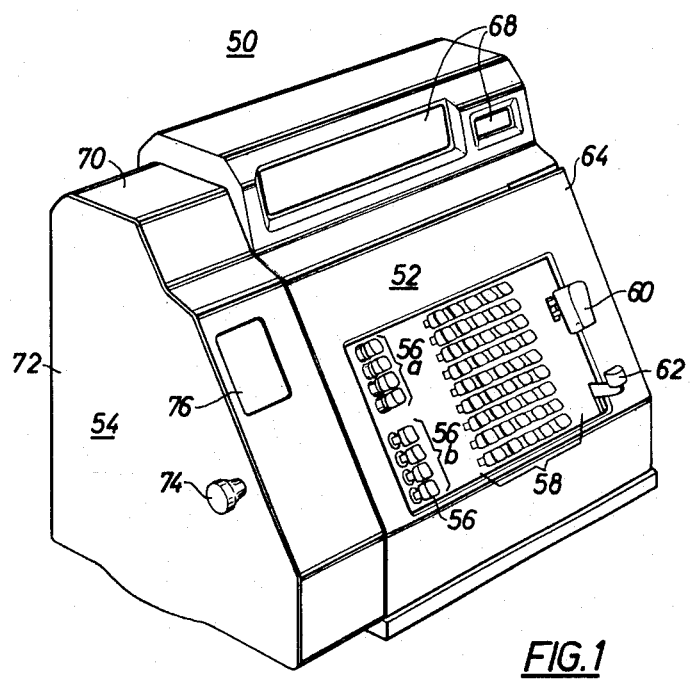
FIG. 1 is a perspective view of a cash register including an improved recording or perforating means embodying the present invention.
Figure 2:
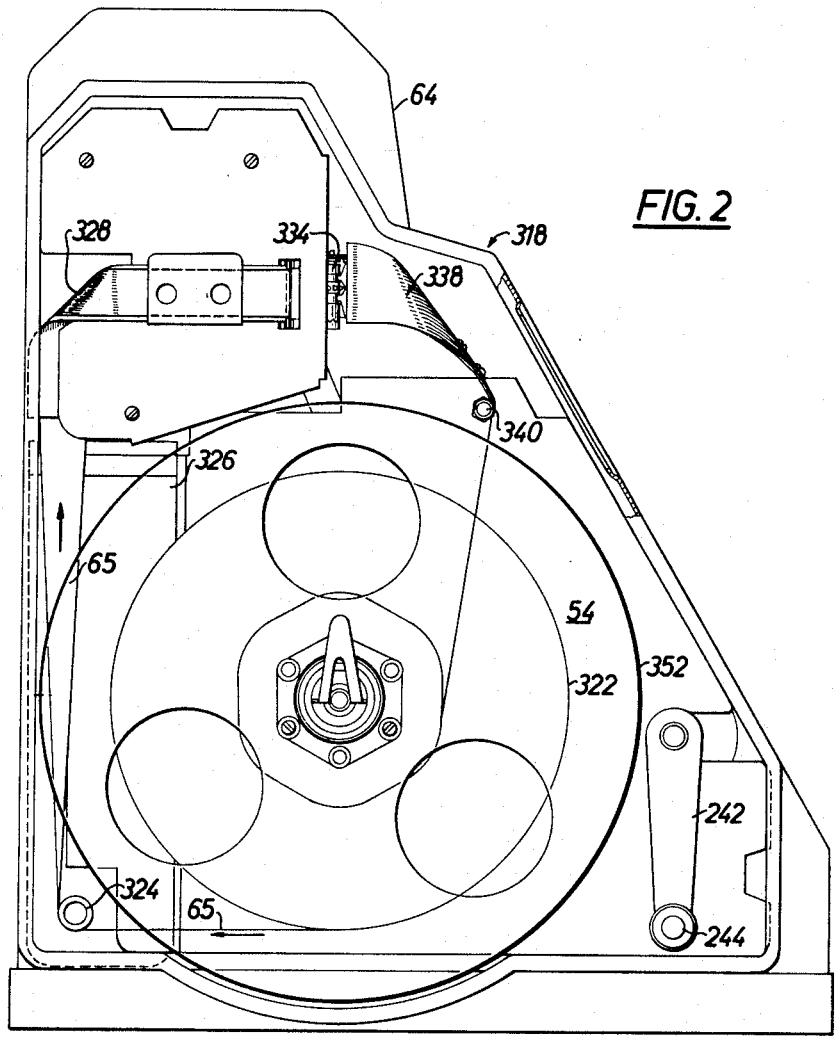
FIG. 2 is a side elevational view of the cash register with the side wall removed to disclose the perforator.

Referring now more specifically to FIG. 1 of the drawings, therein is illustrated a data handling apparatus or cash register assembly indicated generally as 50, which includes a cash register 52 and a perforating unit 54 for recording fixed and variable items of data. The cash register 52 includes conventional means for receiving various items of control and digital data from a keyboard and for performing various operations on the entered information, such as accumulating the total amount of goods sold or charged and the total amount of goods sold by different clerks. Certain of these items of information are automatically recorded by the perforating unit 54 which includes a punching assembly, indicated generally as 55 (FIGS. 4 and 5–7), for recording coded digital signals on an audit strip or paper tape 65 (FIG. 2). Since only certain of the items of information provided by the cash register 52 are to be recorded, the data handling apparatus or cash register assembly 50 includes a selector control assembly 57 (FIGS. 12 and 13) that is operable to render the perforating unit 54 effective or ineffective to record data under the control of the cash register 52 in accordance with the mode of operation of the cash register.

Since it is desirable to identify the source of the primary data records or punched tapes 65 produced by a plurality of different cash register assemblies 50, each of the data handling units 50 includes manually operable means, indicated generally as 59 (FIGS. 23–26), for feeding the tape 65 and automatically recording fixed items of information thereon. These fixed items of information, which may include the designation of the register as well as other identifying indicia, are automatically recorded on the tape 65 by the punching unit 55 in response to operation of the manually actuated assembly 59. This assembly is used to insert the tape 65 into the punching unit 55 and to feed out a portion of this tape when a perforated portion thereof is to be removed, as at the end of a day.

The cash register 52 can comprise any of the constructions well known in the art, such as the cash register mechanisms shown in the copending applications of Gosta R. Englund, Serial No. 633,947 filed January 14, 1957, now Patent No. 3,040,978, and Serial No. 6,522 filed February 3, 1960, now Patent No. 3,103,309, both of which applications are assigned to the same assignee as the present application. In general, each of these cash registers includes a keyboard comprising a plurality of groups of keys for entering digital and control information. In the keyboard illustrated in FIG. 1, a key bank 56 includes a first group of clerk keys 56a and a second group of selector or mode of operation control keys 56b. The key group 56a, which can comprise locking type keys, supplies the cash register 52 with information identifying the clerk or clerks operating the cash register. The key group 56b generally performs the functions of directing the type of operation to be performed by the cash register 52 and of indicating the significance to be attributed to digital information entered into the cash register 52 by the operation of a key group 58 comprising five denominationally ordered key banks. As an example, the selective actuation of the keys in the group 56b can indicate that the digital data represented by actuated keys in the group 58 represents an amount to be charged, an amount of a cash sale, or the designation of a customer. The keyboard also includes a starting or motor bar 60 and a correction key 62.

The controlling or accumulating mechanisms in the cash register 52, which are enclosed in a housing 64, can include a plurality of differentially settable racks or gear segments adjustable to positions corresponding to the actuated ones of the keys in the groups 56a, 56b, and 58. These differentially settable elements control the entry of amounts into accumulators in the cash register and also control the transfer of information from both the accumulators and the keyboard to a plurality of indicator wheels (not shown) visible through one or more windows or openings 68 in the housing 64. Thus, the indicator wheels can be set to positions corresponding to both the information entered by the keyboard and the data stored in the accumulators.

To provide means for supplying information from the cash register 52 to the perforating unit 54 for recording thereby, the cash register 52 includes a plurality of indicator pinion gears 78 that are secured to individual ones of a plurality of telescoping shafts 80 (FIG. 4). The telescoping shafts 80 are driven in synchronism with the setting of the indicator wheels in the cash register 52 so that the indicator pinion gears 78 are moved to setting corresponding to information transferred to the indicator wheels from either the keyboard or the accumulators in the cash register 52. To provide means for transmitting the settings of the pinion gears 78 to the perforating unit 54, a plurality of telescoping shafts 82 each carrying one of a plurality of pinion gears 84 is provided. Each of the pinion gears 84 meshes with one of the indicator pinion gears 78 so that when the pinion gears 78 are adjusted to data representing positions, the telescoping shafts 82 are adjusted to corresponding positions to supply the information to be recorded to the perforating unit 54.

As indicated above, the perforating unit 54 is to be automatically rendered effective to record only certain items of information derived from the cash register 52 on the paper tape 65. To achieve this selective control over the operation of the perforating unit 54, the selector control assembly 57 (FIGS. 12 and 13) is provided. This assembly is provided with information concerning the mode of operation performed by the cash register 52 by a shaft 88 that is rotated to different angularly displaced positions corresponding to the setting of a rack or gear segment (not shown) in the cash register 52. This mode of operation or selector rack or gear segment is adjusted either under the control of automatic programming means included in the cash register 52 or under the control of an operated key in the groups 56a and 56b. Thus, when the shaft 88 is rotated to a particular setting representing a particular operation, a control cam 90 secured to the shaft 88 is adjusted to a corresponding setting to operate the assembly 57 so that the punching unit 55 is rendered effective or ineffective.

When a cycle of operation of the cash register 52 is initiated by depressing the motor bar 60, a main drive shaft 86 (FIG. 4) is placed in operation so that the selector or mode of operation slide or gear segment (not shown) is first moved to a setting representing the operation to be performed by the cash register 52. During this movement of the mode of operation gear segment or slide, the shaft 88 is rotated to a position representing the mode of operation that is to be performed by the cash register, and the control cam 90 in the selector control assembly 57 is adjusted to a corresponding position to condition the perforating unit 54 to either record or ignore the digital information that is subsequently transmitted from the cash register 52 to this perforating unit. During a succeeding portion of the rotation of the main shaft 86, the differentially settable gear segments or slides controlled by the keys in the group 58 or by the accumulator means adjust the indicator wheels to settings representing the entered or accumulated information. During the setting of the indicator wheels, the telescoping shafts 80 and 82 and the pinion gears 78 and 84 transmit the digital information to the punching assembly 55. At the conclusion of the data handling operation, the main shaft 86 returns to its normal position. The components of the perforating unit 54 including the selector control assembly 57, the punching unit 55, the manually actuated tape feeding and punching assembly 59 are enclosed in a housing 70 secured to one side of the housing 64 of the cash register 52. This housing is provided with an access door 72 carrying a knob 74 and with a window 76 which permits visual inspection of the tape 65.

To provide means for automatically recording information from the cash register 52 on the audit strip or tape 65, there is provided the punching assembly 55 shown in its normal position in FIGS. 6, 7 and 8. The punching assembly 55 includes a plurality of punch elements or punch pins 92 which are slidably received and guided in a plurality of rear plates 94 and a forward plate or female die assembly 96. The assembly 96 includes a pair of adjacent plates 98 and a die plate 100 held in spaced relation by a separator plate 102 to form a tape receiving opening 104. The plates 94 and 98 contain a plurality of openings 94a and 98a, respectively, for slidably receiving the punching elements 92. The plate means 94 and the die assembly 96 are held in spaced relation by a plurality of shouldered spacers 106 and a plurality of bolts 108.

In order to mount the punching assembly 55 in the perforating unit 54, there is provided a stationary puller plate 110 which is fixedly secured to a stationary frame portion of the perforating unit 54 between a pair of plates 112 and 114 (FIG. 4) by a plurality of pins or screws 116. The puller plate 110 contains a plurality of openings 110a through which the punching members 92 pass and a plurality of larger openings 110b. Some of the openings 110b slidably receive the spacers 106, and others of these openings slidably receive a plurality of guide pins 118 secured to a U-shaped element 120. The guide pins 118 are also slidably mounted in aligned openings in the plates 94, 98, 100 and 102. The puller plate 110 therefore supports the plates 94 and the assembly 96 through the spacers 106 and guide pins 118 and guides these elements for reciprocal motion relative to the puller plate 110.

In order to provide a first actuating means for the punching assembly 55, there is provided the U-shaped element or yoke 120 having a bight portion 120a which extends in front of the die assembly 96 and which is secured to the spacers 106 by nuts 121 which are threaded on the ends of the bolts 108. The bight portion 120a of the U-shaped element has a large central chad opening 120b. The spacers 106 and guide pins 118 slidably support the forward end of the U-shaped element 120 through the puller plate 110. The U-shaped element 120 also includes a pair of rearwardly extending arms 120c and 120d. The rear end of the element 120 is slidably supported by a hub 122 (FIGS. 4 and 10) which is secured to the plate 114 and which is received within a notch 123 (FIG. 9) formed in the arm 120c.

In order to provide perforations in the audit strip or tape 65 for each digit to be recorded by the perforating unit 55, the punch elements 92 are mounted in spaced parallel rows each corresponding to one of the digits or data items to be recorded (FIGS. 5 and 6). For each row of punching elements 92, there is provided a selector or code disc assembly 124 (FIGS. 7 and 8) including a pair of code discs 126 secured to opposite sides of an intermediate guide plate or disc 128. The outer periphery of each of the code discs 126 is provided with a plurality of distinct sectors or segments having a pattern of recesses and projections 130 forming a coded representation of the digit or data item.

In order that each row of punches 92 can be selectively actuated by the pair of code discs 126 in a single code disc assembly 124, the punching elements 92 are divided into two groups designated generally as 132 and 134 (FIG. 8). The head portions of the elements 92 in the group are offset axially in one direction from the plate 128 to be actuated by one of the code discs 126, and the head portions of the punch elements 92 in the group 134 are offset axially in the opposite direction relative to the plate 128 so as to be actuated by the code discs 126 on the opposite side of the guide disc 128. Each row of punch elements 92 include one punch element 92a for punching a feed hole in the tape 65 and five other punch elements 92b, 92c, 92d, 92e, and 92f for punching the five bits of a code representing a digit.

Each code disc 126 is divided into ten sectors or segments of code representing recesses and projections 130, each of which correspond to the code for one digit. The segments on one of the discs 126 in each selector assembly 124 actuates one of the groups 132 of aligned punch pins 92, and the segments on the other of the code discs 126 in the same selector assembly 124 actuate the punch elements 92 in the group 134 in the corresponding row. The coded sectors on the two discs 126 in a given code disc assembly 124 which represent the same data item or digit are angularly offset about the axis of the assembly 124 so that the spaced groups 132 and 134 of aligned punching pins 92 can be concurrently actuated. Since a feed hole is punched in the tape 65 during each punching operation, each of the ten segments on the code discs 126 includes a projection 130 which actuates the feed hole punch element 92a.

In order to selectively set the code disc assemblies 124 in positions corresponding to the information from the cash register 52, each selector assembly 124 is secured to one of the telescoping shafts 82. Each of the code disc assemblies 124 is provided with an axial opening, and at least one of the discs 126 is provided with a plurality of projecting portions or lands 138. These lands engage or are splined to corresponding notches on a disc 136 that is secured to the outer end of one of the telescoping shafts 82. When the telescoping shafts 82 are set by the register 52 to represent the information on the indicator pinion gears 78, the code disc assemblies 124 are rotated to settings corresponding to the data transferred to the indicator wheels of the cash register. A pair of notched bars 139 (FIGS. 4 and 7) secured between the plates 112 and 114 engage the edges of the guide disc 128 to hold the selector assemblies 124 in a parallel relationship.

In order to provide for a coded representation of the mode of operation of the register 52, there is provided a mode of operation disc, here shown as an innermost disc 140 (FIG. 4). This disc is connected to an outermost disc or member 142 by means of a connecting arm 144. The mode of operation code disc 140 is freely rotatable about the outermost telescoping shaft 82 and contains peripherally spaced coded sectors representing the different modes of operation of the cash register 52. The outermost disc 142 is connected to the innermost of the telescoping shafts 82 which is actuated in synchronism with the mode of operation shaft 88. The outermost disc 142 also covers the outermost of the code disc assemblies 124.

In order to actuate the punching assembly 55 in synchronism with the operation of the cash register 52, there is provided a punch actuating mechanism driven by the cash register which is indicated generally as 146 and which is shown in FIGS. 14 and 15. The mechanism 146 moves the U-shaped element 120 to the left in FIG. 7 to actuate the punch elements 92 under the control of the selector assemblies 124. The perforating unit 54 includes a main shaft 148 which is driven through one revolution for each cycle of revolution of the main drive shaft 86 in the cash register 52, and which is keyed to a punching cam 150 forming a part of the mechanism 146. To transmit the motion from the punching cam 150 to the punching assembly 55, there is provided a drive link 152 and a segment arm 154. The link 152, which is pivotally mounted on a fixed shaft 156, has a roller 158 at the end of a first arm 152a and is provided with a cam surface 160 along the edge of a second arm 152b. The roller 158 is adapted to engage a cam edge 162 on the punching cam 150, and this cam carries a roller 164 adapted to engage the cam surface 160. The drive link 152 has a third arm 152c provided near its free end with an elongated opening or slot 166. The segment arm 154 is operatively connected to the drive link 152 by a pin 168 which passes through the slot 166 and another slot 170 in the end of segment arm 154.

In order to drive the U-shaped element 120 in response to movement of the segment arm 154, there is provided an upper actuating shaft 172 and a lower actuating shaft 174 (FIG. 11) to which the upper end of the arm 154 is secured. A pair of meshing sector gears 176 are secured to one end of each of the shafts 172 and 174 to drivingly interconnect these shafts. The other end of each of the shafts 172 and 174 is secured to one of a pair of sector gears 178 which engage a pair of rack gears 180 formed along two edges of a U-shaped element or yoke 182. The opposite ends of shafts 170 and 172 are disposed and held in a plurality of recesses 186 formed in the upper and lower edges of the arms 120c and 120d of the U-shaped element 120 by two connecting plates 184 having openings for rotatably receiving the ends of these shafts.

The machine actuated punching operation is actuated by the punching cam 150. As this cam rotates counterclockwise from the neutral position illustrated in FIG. 14, the roller 164 engages the cam surface 160 of the drive link 162 to pivot the drive link 152 counterclockwise about the shaft 156. The counterclockwise rotation of the link 152 deflects the lower end of the arm 154 toward the position shown in FIG. 15. This applies torque in a clockwise direction to the shaft 174 which is transmitted through the sector gears 176 to the upper shaft 172. The shafts 172 and 174 apply a driving torque to the rack gears 180 through the sector gears 178. However, the rack gears 180 are held in a fixed position during a machine actuated punching operation so that the actuating shafts 172 and 174 shift horizontally from the position shown in FIG. 7 to the position shown in FIG. 9. Because of the engagement of the shafts 172 and 174 with the walls of the recesses 186, the U-shaped member 120 and the remainder of the punching assembly 55 is moved rearwardly toward the code disc assemblies 124.

In order to perforate the tape 65 in the tape receiving opening 104 of the female die assembly 96 during the machine actuated punching operation, certain selected ones of the punching elements 92 are blocked from rearward movement by the projections 130 on the code discs 126 corresponding to the coded digital representation set up by the cash register 52. The punch elements 92 that engage the projections 130 cannot move rearwardly with the element 120 and are forced through the openings 98a in the plates 98 to perforate the tape 65. The punch elements 92 that do not engage projections 130 move with the element 120 and do not punch the tape 65. The punching pin 92a always engages a projection 130 to punch a feed hole in the tape.

In order to return the punching assembly 65 to a neutral position after the audit strip 65 has been perforated, a cam surface 188 (FIGS. 14 and 15) on the cam 150 engages the roller 158 during continued clockwise rotation of this cam to pivot the drive link 152 in a clockwise direction about the shaft 156. This moves the lower end of the arm 154 to the right so that the actuating shafts 172 and 174 are moved to the right from the position shown in FIGS. 9 and 15 to the positions shown in FIGS. 7 and 14. This movement of the actuating shafts 172 and 174 moves the U-shaped element 120 to the right (FIGS. 7 and 9) so that shoulders 190 formed on the punch elements 92 engage the edges of the openings 110a in the fixed plate 110 to restore these punch elements to the normal positions shown in FIG. 7.

To provide means for selectively driving the main shaft 148 of the perforator 54 when a punching operation is called for by the particular mode of operation of the cash register 52, there is provided the control assembly 57 (FIGS. 12 and 13). The control assembly 57 determines whether or not the main shaft 148 of the perforating unit 54 is drivingly connected or coupled to the main shaft 86 of the cash register 52. The control assembly 57 is provided with information concerning the mode of operation performed by the cash register 52 by the shaft 88 and cam 90 which are rotated to different angularly spaced positions corresponding to the settings of a mode of operation rack or gear segment (not shown) in the cash register 52.

The control assembly 57 includes a slide 192 having an upper elongated opening or slot 194 and a lower elongated opening or slot 196. The shaft 88 passes through the upper elongated opening 194 to slidably mount the upper end of the slide 192, and a pin 198 is provided which passes through the lower elongated opening 196 to slidably mount the lower end of the slide 192. The slide 192 is provided with a pair of cam followers 200 which ride on the surface of the mode of operation cam 90 to position the slide 192 in accordance with the mode of operation selected by the register 52. The slide 192 contains a recess 202 along one edge intermediate its ends.

In order to transmit information concerning the position of the slide 192, there is provided a lever 204 which is pivotally mounted on a shaft 206 intermediate its ends and which is provided at one end with a stud 208 that extends into the recess 202. A link 210 is pivotally connected between the other end of the lever 204 and a plate 212 that is pivotally mounted on a shaft 214.

To provide a driving engagement between the main shaft 86 (not shown in FIGS. 12 and 13) of the cash register 52 and the main shaft 148 of the perforator unit 54, there is provided a driving plate 216 that is secured to the main shaft 86 of the cash register 52 and a driven disc 218 that is secured to the main shaft 148 of the perforating unit 54. A ratchet 220 pivotally mounted on the disc 216 by a stud 222 includes a latch 224 that is engageable with a recess 226 in the driven disc 218. The latch 224 is biased toward the disc 218 by a tension spring 228 that is connected between the ratchet 220 and the plate 216.

When the main shaft 148 is to be connected to the main shaft 86 of the cash register 52, the mode of operation shaft 88 is rotated to a setting such as that shown in FIG. 13 in which the slide 192 pivots the lever 204 to an extreme counterclockwise position. This pivots the plate 212 to its counterclockwise position to move a cam follower 230 carried on the plate 212 out of the path of movement of the ratchet 220. Thus, when the plate 216 is rotated in a counterclockwise direction, the spring 228 biases the latch 224 into the recess 226 and drivingly couples the main shaft 86 of the cash register 52 with the main shaft 148 of the perforating unit 54 (FIG. 13).

When the mode of operation of the cash register 52 does not require a perforating operation, the mode of operation shaft 88 is rotated to a position such as that shown in FIG. 12 so that the cam 90 moves the slide 192 downwardly to pivot the lever 204 and the plate 212 in a clockwise direction. This places the cam follower 230 in the path of movement of an end portion 232 on the ratchet 220. Thus, when the ratchet 220 is adjacent the follower 230, the follower engages the end portion 232 to pivot the ratchet in a clockwise direction against the bias spring 228 to prevent the latch 224 from entering the recess 226 in the disc 218. Therefore, the main shaft 86 of the perforator is disengaged from the main shaft 148 of the perforator 54, and this shaft remains in its normal or neutral position.

The perforating unit 54 also includes manually actuated means for operating the punching unit 55 to automatically record fixed items of information in the tape or strip 65. This manually actuated assembly includes means for moving the U-shaped element 182 into engagement with the selected ones only of the plurality of punch elements 92 provided in the punching assembly 55.

The U-shaped member 182 (FIGS. 10 and 11) includes a bight portion 182a and two rearwardly extending arms 182b and 182c. In order to slidably mount the member 182 on the punching assembly 55, the bight portion 182a is provided with four spaced openings 235 for slidably receiving the spacers 106 and the guide pins 118. In addition, the arm 182b includes a recess or notch 237 for slidably receiving the hub 122 to slidably support the other end of the member 182. The bight portion 182a also includes a plurality of openings 236 for slidably receiving the punch elements 92. In its normal position (FIG. 7), the bight portion 182a of the member 182 is disposed adjacent the apertured portion of the plate 110.

To provide means for recording selected fixed items of information on the tape 65 when the manually actuated assembly is operated, certain ones of the punch elements 92 in one or more of the rows thereof are provided with shouldered portions 240 disposed between the bight portion 182a and the tape receiving opening 104 in the female die assembly 96. In the drawings, the shouldered portions 240 are provided by making the punching ends of the punch elements 92 representing desired code bits longer than the punching ends of the remaining punch elements. In FIGS. 7 and 8 of the drawings, the punch elements 92, 92a, 92b, 92e and 92f are provided with shouldered portions 240 for punching a feed hole and a data item during manual operation. The plurality of punch elements 92 are operated to record the fixed data items by moving the U-shaped member 120 a lesser distance to the left (FIG. 7) than when the punch unit 55 is operated by the cash register 52 and by concurrently moving the U-shaped member 182 to the right (FIG. 7) to engage the shouldered portions 240.

To provide the required motion of the U-shaped elements 120 and 182 toward each other to perform the manually actuating punching operation, there is provided the manual actuating assembly 59 (FIGS. 22–26). The manually operable means 59 performs two separate functions; namely, it drives the main shaft 148 and controls the freedom of movement of the U-shaped elements 120 and 182 to select between a machine actuated operation wherein the code discs 126 are effective to control a perforating operation and a manually actuated punching operation wherein the punch elements 92 are actuated by the bight portion 182a of the U-shaped element 182.

In order to provide means for manually driving the assembly 59, there is provided a crank 242 (FIG. 22) having a crank knob 244 which can be turned clockwise. The crank 242 is secured to a shaft 246 to which is secured a spur gear 248. The spur gear 248 is in driving engagement with a cooperating spur gear 250 mounted on a shaft 252. The spur gear 250 drivingly engages a spur gear 254 which carries a pin 256 and which is rotatably mounted on a shaft 258.

Figure 10:
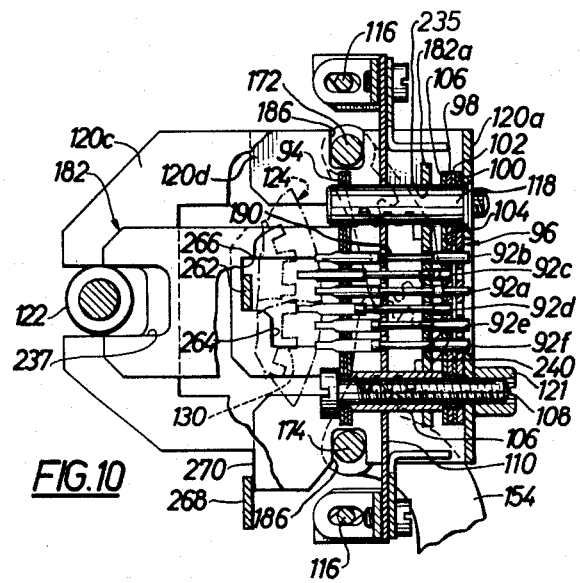
FIG. 10 is a fragmentary sectional view similar to FIG. 9 illustrating the punching unit in a manually operated punching position.
Figure 9:
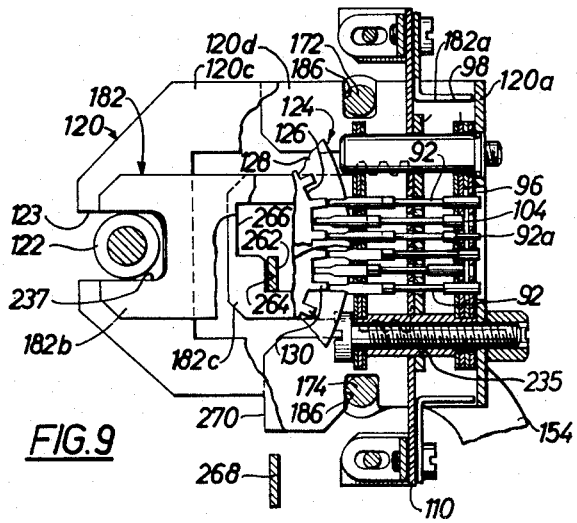
FIG. 9 is a fragmentary sectional view illustrating the punching unit in a punching position during a machine actuated punching operation.
Figure 16:
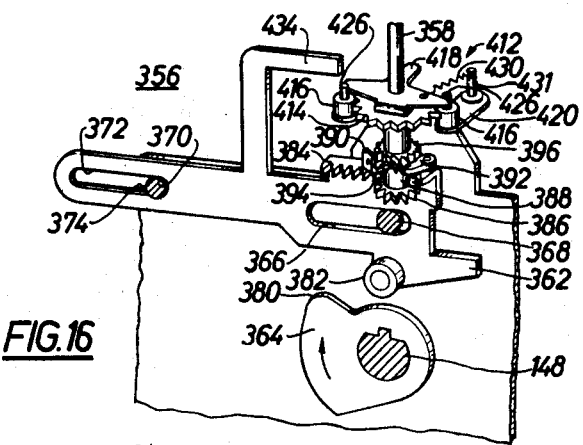
FIG. 16 is a perspective view of an audit strip or tape feeding mechanism illustrated in a normal position.
Figures 19, 20:
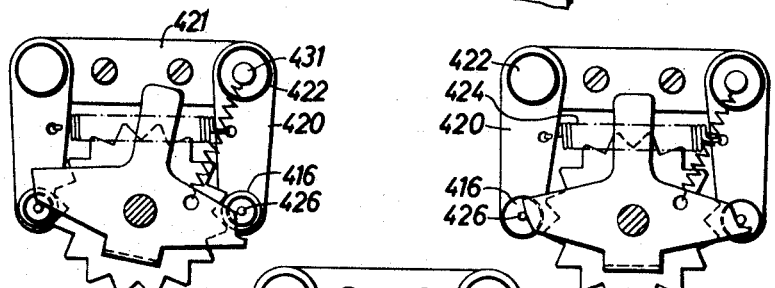
FIG. 19 is a plan view of a tape feed detent means illustrated in a normal position.
FIG. 20 is a plan view similar to FIG. 19 showing the tape feed detent means during a tape feeding operation.
Figure 21:
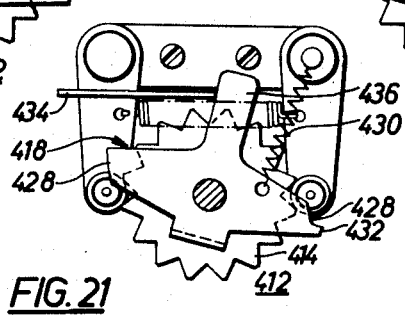
FIG. 21 is a plan view similar to FIG. 19 showing the tape feed detent means at the completion of a tape feeding operation.

In order to control movement of the U-shaped elements 120 and 182, there is provided a selector slide 260. The selector slide 260 supports a sop or cross arm 262 that normally engages a pair of shoulders 264 on the arms 182b and 182c of the U-shaped element 182 to block movement of this element to the right (FIGS. 9, 11 and 23). The selector slide 260 is also provided with a second stop arm 268 adapted to move between a first position out of the path of movement of the U-shaped element 120 and a second position wherein the stop arm 268 is adapted to engage a stop shoulder 270 on the arm 120c of the U-shaped element 120, thereby to limit the movement of the element 120 to the left (FIGS. 10 and 26).

To control the vertical position of the selector slide 260, there is provided a lever 272 which is pivoted on the shaft 156 and which is arranged to be actuated by the pin 256 on the spur gear 254. One end of the lever 272 is connected to the lower end of the selector slide 260 by a link 274, and the other end of the selector control lever 272 is provided with a somewhat egg-shaped or oval opening 276, the inner edges of which constitute cam surfaces 278. As the selector spur gear 256 is driven clockwise during the operation of the assembly 59, the pin 256 moves along the cam surface 278 from the position illustrated in FIG. 23 through the position shown in FIG. 24 to the position illustrated in FIG. 25. This pivots the lever 272 clockwise to move the slide 260 upwardly to a position in which the stop arm 268 is aligned with the shoulder 270 and the arm 262 is out of alignment with the shoulder 264 and in alignment with the shoulder 266. This frees the U-shaped element 182 for movement to the right (FIG. 7) and limits movement of the element 120 to the left (FIG. 7). When the U-shaped elements 120 and 182 are free to move to the left and right (FIG. 7), respectively, the actuating shafts 172 and 174 can rotate about their axes to move the member 182 to the right as well as move the element 120 to the left when a turning torque is applied to them by the arm 154. This relative movement of the elements 120 and 182 actuates the punch elements 92 with the shouldered portion 240 to record the fixed data entry.

This relative movement is produced by actuating the arm 152 under the control of the main shaft 148. To accomplish this, the assembly 59 includes a gear and ratchet assembly 280 (FIG. 22) having a spur gear 282 freely rotatable about a bearing 284 on the main shaft 148. The gear 282 meshes with the spur gear 254 so that rotation of the crank 242 in a clockwise direction is effective to drive the spur gear 282 counterclockwise through the gear train including the gears 248, 250 and 254. One edge of the spur gear 282 is provided with a plurality of ratchet teeth 286. In order to drive the main shaft 148, there is provided a plate 288 that is fixedly secured to the main shaft 148 and on which a ratchet arm 290 is pivotally mounted by a pivot pin 292. The arm 290 is biased into engagement with the ratchet teeth 286 by a tension spring 294 that is connected between the plate 288 and the arm 290. When the main shaft 148 of the perforator is driven by the gear 282 in the assembly 59, the ratchet teeth 286 are engaged by the ratchet member 290 to rotate the plate 280 and the main shaft 148 in a counterclockwise direction.

When the main shaft 148 of the perforator unit 54 is rotated during a machine actuated operation, the ratchet 290 slides over the ratchet teeth 286 so that the gear 282 is not driven. Moreover, when the main shaft 148 of the perforator is driven by the assembly 59, the main shaft 86 of the cash register 52 is not rotated because the latch 224 (FIGS. 12 and 13) on the ratchet 220 slides out of the recess 226 on the driven disc 218.

In order to actuate the punching assembly 55, rotation of the main shaft 148 actuates the link 152 and the arm 154 to supply a clockwise directed driving torque to the shafts 172 and 174 in the manner described above. This causes the shafts 172 and 174 to move to the left from the position shown in FIG. 7 to the position shown in FIGS. 10 and 25, which latter position is determined by engagement of the shoulder 270 with the arm 268. However, the shafts 172 and 174 also rotate in a clockwise direction so that the sector gears 178 drive the rack portions 180 to move the member 182 to the right from the position shown in FIGS. 7 and 24 to that shown in FIGS. 10 and 25. This movement is arrested by engagement of the shoulder 266 by the arm 262. The element 182 engages the shouldered portions 240 during this relative movement to operate the selected punch elements 92.

In order to provide an additional relative movement of the U-shaped members 120 and 182 toward each other during the manually actuated punching operation, there is provided a control disc 296 (FIGS. 23–26) which is fixedly secured to the shaft 246 to driven with the crank 242. The control disc 296 is provided with a cam pin 298 extending from its face that is adapted to engage a lever 300. The lever 300 is pivotally mounted on the link 152 by a pivot pin 302 and is normally held out of engagement with the cam pin 298 by a pin 304 carried on the link 152 which engages an edge of the punch lever 300. After the roller 164 engages the cam surface 160 to rotate the link 152 counterclockwise, the lever 300 also rotates counterclockwise so that the free end of the lever 300 moves upwardly and a lug 306 thereon is engaged by the cam pin 302 (FIG. 25). Continued rotation of the control disc 296 moves the lever 300 to the left to the position shown in FIG. 26 to produce a final counterclockwise rotation of the link 152 beyond that which can be obtained from the engagement of the roller 164 with the cam surface 160.

In order to return the punching assembly 55 to a normal position after the completion of the punching stroke, the continuing rotation of the main shaft 148 brings the cam surface 188 into engagement with the roller 158 to move the link 152 clockwise and to transmit a driving torque to the arm 154 that is effective through the actuating shafts 172 and 174 to move the U-shaped elements 120 and 182 away from each other. The pin 298 moves upwardly with the control disc 296 out of engagement with the lug 306 of the punch lever 300. Continued rotation of the crank 242 is effective to bring the pin 256 into engagement with the upper portion of the cam surface 278 and resets the selector slide 260 to block the U-shaped element 182 to prepare the punching assembly 55 for future machine actuated punching operations.

In order to insure that the crank 252 is manually rotated in a counterclockwise direction only, there is provided a ratchet 308 (FIGS. 23 to 26) which is rotatably mounted on a stationary frame 312 by a pin 310. The check ratchet 308 is biased by a spring 314 into engagement with the notched periphery 316 of the disc 296. The check ratchet 308 is effective to engage the notched periphery 316 if the control disc 296 is rotated counterclockwise. However, the check ratchet 308 slides over the periphery 316 during clockwise rotation of the crank 242.

Figure 3:
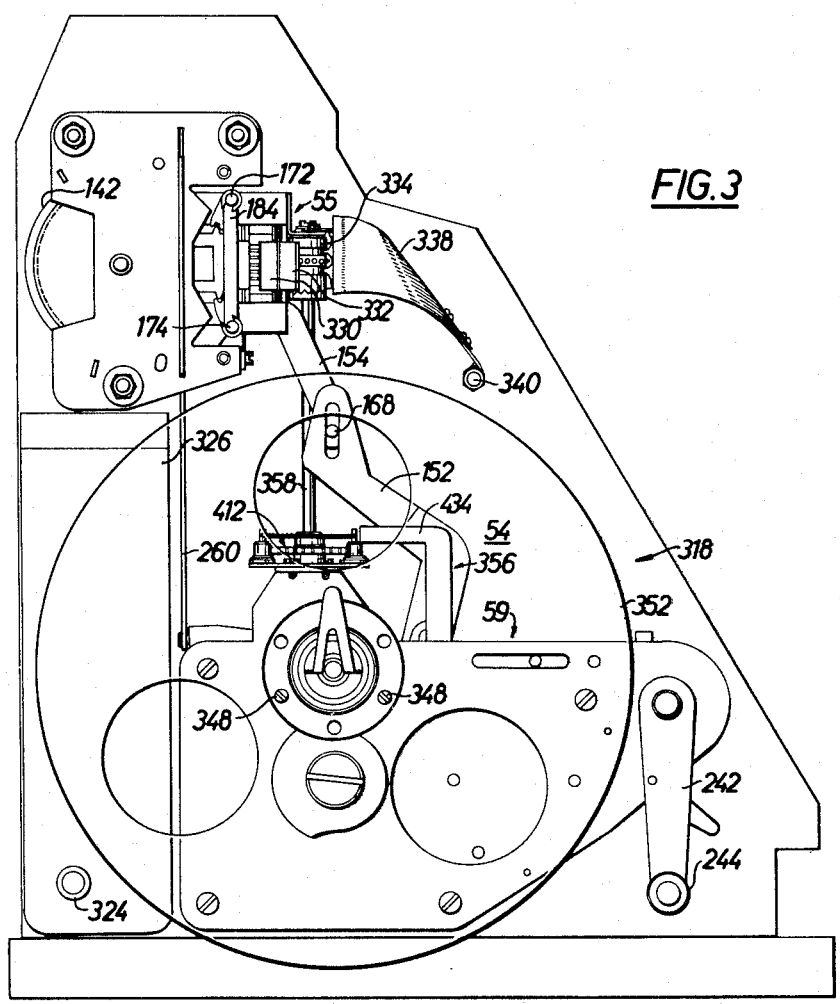
FIG. 3 is a side elevational view similar to FIG. 2 which illustrates the perforator with certain parts removed.

To supply the audit strip or tape 65 to the punching assembly 55, there is provided a tape guiding means shown generally at 318 (FIGS. 2–4). The tape guiding means 318 includes a spindle or hub 320 adapted to receive a roll 322 of unperforated tape 65. The tape 65 from the roll 322 is fed over a guide pulley 324, which is secured to a chad container 326, and is then threaded upwardly through an arcuate guide means 328 to the tape receiving opening 104 in the die assembly 96. The audit strip 65 is guided into the tape receiving opening 104 by a pair of diverging lips 330 and 332 (FIG. 6) formed integral with the pair of spaced plates 98 and 100, respectively. After passing through the tape receiving opening 104 in the die assembly 96, the tape 65 is guided around a rotatable sprocket wheel 334, through an arcuate guide means 338, and over a guide pulley 340 to be received on a take-up reel assembly 342. The direction of movement of the tape 65 is illustrated by the arrows in FIG. 2.

The reel assembly 342 includes a hub member 344 and a plurality of pins 346 and 348. The pins 346 are fixed to a rear transparent disc 350, and the plurality of pins 348 are secured to a front transparent disc 352. The discs 350 and 352 form spaced walls of a reel on which the punched tape 65 is wound. The end of the perforated audit strip 65 can be fastened to the hub 344 by inserting its free end between the pluralities of pins 346 and 348 and a spring 354 disposed in a groove on the hub 344. The hub 344 is driven by suitable drive means so that the inner convolution of the punched tape roll is wound around the outer surfaces of the pins 346 and 348. When the front disc 352 is removed, the punched tape roll is carried on the pins 348 secured thereto.

A tape feeding assembly 356 is provided in the unit 54 for automatically feeding the tape 65 when the punching unit 55 is either manually or automatically operated. The tape feeding assembly 356 (FIGS. 16–21) rotates the sprocket wheel 334 through a fixed distance for each cycle of operation of the unit 54 and is connected to the wheel 334 by a shaft 358. An idler 360 (FIGS. 5 and 6) rotatably mounted on an arm 361 biases the punched tape 65 against the sprocket wheel 334 to provide positive engagement of the tape 65 with the wheel 334.

To provided means for driving the shaft 358 preceding each punching operation, the strip indexing mechanism 356 includes a strip advancing slide 362 driven by a cam 364 fixedly secured to the main shaft 148 of the perforator unit 54. The strip advancing slide 362 is provided with a slot 366 at one end for slidably receiving a pin 368 secured to a stationary frame portion of the perforator unit 54. A second pin 370 secured in a selected position in another slot 372 in the slide 362 is slidably received in a slot 374 in a stationary frame portion of the perforator unit 54 to slidably mount the other end of the slide 362. The second pin 370 can be secured in various positions in the slot 372 by means of a plurality of washers 376 and nuts 378.

In order to actuate the slide 362, the cam 364 is provided with a lobe 380 that engages a roller 382 secured to the slide 362. The slide 362 is further provided with a rack gear 384 in driving engagement with a spur gear 386. The spur gear 386 is fixedly secured to a cylindrical member 388 freely rotatable about the shaft 358. A ratchet plate 390 secured to one end of the member 388 pivotally supports a ratchet 392 that is biased into engagement with the teeth of a ratchet gear or wheel 396 secured to the shaft 358 by a tension spring 394. The ratchet 392 is so arranged that when the slide 362 moves to the right (FIGS. 16-18), the ratchet engages the teeth of gear 396 to rotate the shaft 358 and the sprocket wheel 334, thereby pulling the tape 65 through the die assembly 96.

In order to return the tape advancing slide 362 to a normal position after the completion of the driving stroke, there is provided a Y-shaped member 398 (FIGS. 17 and 18) having a first arm 400 provided with a U-shaped opening 402 at its end for slidably receiving the pin 370. The member 398, which is pivotally mounted on a stationary portion of the perforator unit 54 by a shaft 404, also includes a second arm 406 having a cam surface 408 formed along its lower edge. A slide return pin 410 projecting from one face of the cam 150 is adapted to engage the cam surface 408 after the completion of the tape feeding operation to rotate the member 398 counterclockwise from the position illustrated in FIG. 18 to the position illustrated in FIG. 17. This moves the slide 362 to the left (FIGS. 16 to 18) so that the ratchet 392 slides idly over the teeth of the gear 396 during the counterclockwise rotation of the member 388.

The length of tape 65 that is fed to the punching unit 55 during each punching operation can be adjusted by varying the position in which the pin 370 is secured within the slot 372. The position of the pin 370 in the slot 372 alters the angular position of the arm 406 at the completion of the tape feeding movement and therefore determines the amount of effective rotation of the member 398 by the slide return pin 410 during the return stroke of the slide 362.

In order to provide means for holding the shaft 358 in the position set by the slide 362, there is provided a detent means 412 (FIGS. 16 and 19-21) which includes a detent wheel 414 secured to the shaft 358 and a pair of rollers 416 biased into recesses on the detent wheel 414. A control plate 418 selectively renders the rollers 416 effective and ineffective to engage the detent wheel 414.

The rollers 416 are rotatably mounted on one end of a pair of follower arms 420 whose other ends are pivotally mounted on a rigid frame member 421 by a pair of shafts 422. The arms 420 are biased toward each other by a tension spring 424 which is connected between these arms and which normally biases the rollers 416 against the wheel 414. The control plate 418, which is freely mounted on the shaft 358, includes two spaced cam or end surfaces 428 which can be moved into and out of engagement with two pins 426 on the free ends of the arms 420 to control the engagement of the rollers 416 with the detent wheel 414. A tension spring 430 connected between the plate 418 and a pin 431 on the frame 421 normally biases the plate 418 into the position illustrated in FIG. 19 in which the cam surfaces do not engage the pins 426.

When the shaft 358 is first rotated in a clockwise direction by the slide 362, the detent wheel 414 pivots the arm 420 away from the shaft 398 to move the rollers 416 out of the recesses in the wheel 414. The tension spring 430 now pivots the control plate 418 counterclockwise from the position illustrated in FIG. 19 to the position illustrated in FIG. 20 so that the cam surfaces 428 engage the pins 426 to hold the rollers 416 spaced from the wheel 414. A projection 432 on one of the end surfaces 428 engages one of the pins 426 to limit the counterclockwise rotation of the plate 418.

In order to render the detent means 412 effective to lock the detent wheel 414, the slide 362 is provided with an arm 434 which engages an extension 436 on the plate 418 when the slide 362 reaches the end of its tape advancing stroke. The movement of the arm 434 to the right (FIGS. 17 and 21) rotates plate 418 clockwise so that the cam surfaces 428 thereof are disengaged from the pins 426, and the spring 424 moves the rollers 416 toward each other and into the recesses of the detent wheel 414.

Figure 17:
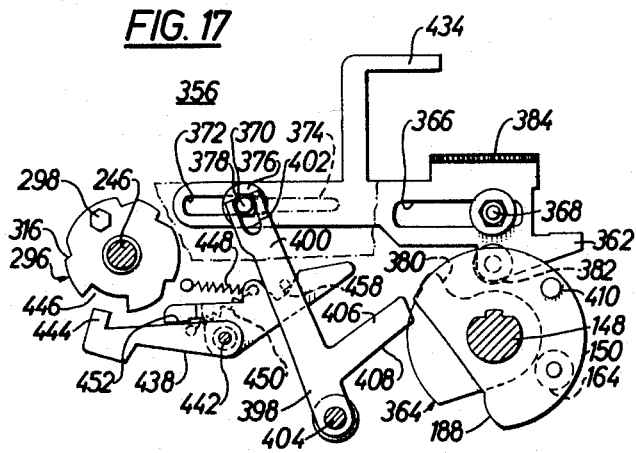
FIG. 17 is a side elevational view of the tape feeding mechanism shown in FIG. 16.
Figure 18:
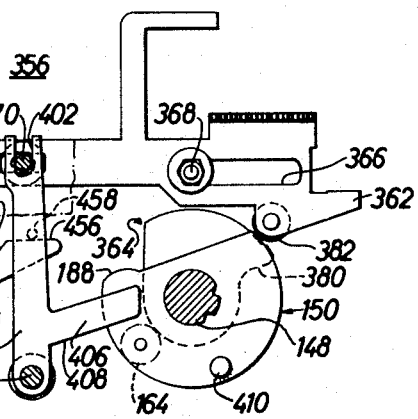
FIG. 18 is a side elevational view similar to FIG. 17 showing the tape feeding mechanism in an operated position.

In order to prevent manual actuation of the punching assembly 55 when the main shaft of the perforating unit 54 is displaced from its normal position, means are provided for locking the assembly 59 (FIGS. 17 and 18). This means includes a pair of levers 438 and 440 pivotally mounted on a stationary portion of the perforating unit 54 by a shaft 442. The lever 438 is provided with a lug portion 444 which is engageable with a notch 446 in the control disc 296 to prevent rotation of the crank 242. A tension spring 450 connected between the levers 438 and 440 biases the lever 438 clockwise relative to the lever 440 so that a stop 452 on the lever 440 normally engages an edge of the lever 438 to limit the motion of levers 438 and 440 toward each other. The levers 438 and 440 are also biased in a counterclockwise direction about the shaft 442 by a tension spring 448 so that the lug portion 444 is normally held out of engagement with the notch 446. An edge of the lever 440 is provided with an inclined cam portion 454 joining a generally horizontal cam portion 456. A pin 458 is provided on the Y-shaped member 398 to engage the cam surfaces 454 and 456.

When the main shaft 148 is in a neutral or normal position (FIG. 18), the cam pin 458 rides near the bottom of the inclined cam portion 454 so that the levers 438 and 440 are biased clockwise by the tension spring 458 and the control disc 296 can be freely rotated by the crank 242. However, as the strip advancing slide 362 is moved toward the right during the tape feeding operation, the pin 458 moves up the inclined cam portion 454 and rides on the generally horizontal cam portion 456 to pivot the levers 438 and 440 clockwise about the shaft 442 against the bias of the tension spring 448. This moves the lug portion 444 of the lever 438 into the notch 446 of the control disc 296 (FIG. 18) to block rotation of the crank 242. The lost-motion connection between the levers 438 and 440 permits relative motion between these levers so that the lug portion 444 is resiliently biased against the bottom of the notch 446. When the shaft 148 returns to a normal position, the counterclockwise movement of the member 398 permits the spring 448 to return the levers 438 and 440 to the normal position shown in FIG. 17.

In order to keep the latch or ratchet 308 (FIGS. 23 to 26) from riding in the bottom of the notch 446 in the control disc 396, the ratchet 308 is provided with a transversely extending arm 462 which engages an edge of the stationary frame 312 of the perforating unit 54 to limit clockwise movement of the ratchet 308 about the shaft 310.

To provide for the collection and removal of chad produced by punching the tape 65, there is provided the chad container 326 illustrated in FIGS. 2 and 3. The fragments severed from the tape 65 are discharged through the opening 120b in the bight portion 120a of the U-shaped element 120 and are conveyed through a conduit 460 (FIG. 7) to the chad container 326.

From the preceding detailed description, it will be seen that the perforating unit 54 is operable under three separate conditions. First, the perforating unit 54 can be operated by the manually operable assembly 59 to feed the tape 65 and to actuate the punching assembly 55 to record a fixed item of information, such as the designation of the particular cash register. In a second operation, the mode of operation shaft 88 (FIGS. 12 and 13) is set in dependence on the selected mode of operation of the cash register 52 to operate the control assembly 57 so that the perforating unit 54 is disconnected from the main shaft 86 of the cash register 52 to prevent a punching operation. In a third type of operation, the perforating unit 54 is operated by the main shaft 86 of the cash register 54 through the mechanism 146 so that variable data items supplied by the cash register 52 are recorded on the tape 65.

When the data handling apparatus 50 is prepared for operation, a roll 322 of tape 65 is positioned in the hub 320 (FIG. 4) of the perforating unit 54, and the end of the tape 65 is threaded over the guide pulley 324, is advanced through the guide means 328 and the tape receiving opening 104 in the female die assembly 96, and is inserted between the sprocket wheel 334 and the idler wheel 360. The tape 65 can now be directly advanced through the guide means 338 or advanced by operating the manually operable assembly 59. The end of the tape 65 is then secured on the hub 344 of the reel assembly 342.

In order to identify the source of the record member or punched tape 65, the manually operated assembly 55 is always actuated when the tape 65 is inserted so that the punching assembly 55 records the designation of the apparatus 50 on the beginning of the tape 65. Assuming that the main shaft 148 of the perforator unit 54 is stopped in its normal position, the lug portion 444 is held out of the notch 446 in the disc 296 so that the crank 242 can be rotated clockwise (FIG. 22). The lever 242 is prevented from being turned counterclockwise by the ratchet 308. Rotation of the crank 242 rotates the main shaft 148 of the perforator in a counterclockwise direction through the gears 248, 250, 254 and 282. The initial rotation of the main shaft 148 moves the lobe 380 of the cam 150 (FIGS. 16–18) into engagement with the roller 382 to drive the strip advancing slide 362 to the right. This rotates the wheel 414 to release the detent assembly 412 so that the shaft 358 and the sprocket wheel 334 are rotated to advance the tape 65. When the slide 362 reaches the position shown in FIG. 18, the arm 434 pivots the plate 418 to render the detent assembly 412 effective to lock the wheel 414 and 334.

In order to control the punching operation during the manually actuated operation so that the U-shaped members 182 and 120 are moved toward each other to punch the identifying data into the strip 65, the initial rotation of the crank 242 is effective to position the selector slide 260 vertically upwardly from its normal position to its set position through the engagement of the pin 256 and the shaft 258 with the cam surface 278 on the selector control lever 272. In this set position, the stop arm 262 is effective to free the U-shaped element 182 for limited movement, and the stop arm 268 is in a position to limit movement of the U-shaped element 120.

In order to move the elements 120 and 182 toward each other to punch the fixed data item on the tape 65, the continuing rotation of the crank 242 drives the roller 164 on the punching cam 150 into engagement with the cam surface 160 on the drive link 152 so that the link 152 rotates in a counterclockwise direction to apply a clockwise directed torque to the segment arm 154. This places a clockwise directed torque (FIGS. 7, 9–11, and 23–26) on the actuating shafts 172 and 174 to cause these shafts to rotate so that the element 182 is driven to the right by the engagement of the gears 176 with the rack gears 180 on the element 182. At the same time, the actuating shafts 172 and 174 move to the left to drive the U-shaped element 120 to the left.

In order to provide an additional movement of the U-shaped elements 120 and 182 toward each other during the last period of the manually actuated punching operation, the pin 298 on the disc 296 engages the lug 306 of the punch lever 300 to give an additional counterclockwise movement to the drive link 152, moving the drive link 152 from the position illustrated in FIG. 25 to the position illustrated in FIG. 26. This movement of the element 182 blocks the punch elements 92 having the shouldered portions 240 (FIG. 10), and the concurrent movement of the element 120 moves all of the punch elements 92 toward the actuating element 182 so that the fixed data item is recorded in the tape 65.

Continued rotation of the crank 242 returns the punching assembly 55 from the operated position (FIG. 10) to the normal position (FIG. 7) by engagement of the punch roller 158 with the lobe 188 of the cam 150. At the same time, the pin 256 and the shaft 258 are effective to rotate the lever 272 counterclockwise so that the selector slide 260 is moved downwardly to the normal position in which the stop arm 262 blocks forward movement of the element 182. At the same time, the stop arm 268 moves downwardly out of alignment with the stop shoulder 270 on the U-shaped element 120 so that the U-shaped element 120 is freed for full movement to the left (FIG. 7). The above-described operation can be repeated several times by continuing to rotate the crank 242. Accordingly, the tape 65 has now been advanced through the punching assembly 55 and the fixed data item has been recorded, one or more times, as the first item of information on this tape.

The data handling apparatus 50 can now be operated under the control of the cash register 52. This cash register is operated in the normal manner so that data items are selectively entered into the accumulating means or transferred under the control of the keyboard or the accumulators to the indicator wheels (not shown). Incident to each cycle of operation of the cash register 52, the telescoping shafts 82 are adjusted to data representing positions corresponding to the items of information displayed on the indicator wheels, and the mode of operation means in the cash register 52 is adjusted to different settings in accordance with the type of operation being performed by the cash register. If the mode of operation requires an output data recording operation, the main shaft 86 of the cash register is rendered effective to actuate the punching assembly 55 in accordance with the data items transferred to the selector means or code disc assemblies 124 by the telescoping shafts 82. Alternatively, if the data supplied to the selector means 124 by the shafts 82 is not to be recorded, the mode of operation shaft 88 is adjusted by the cash register 52 to a setting in which the assembly 57 prevents the connection of the main shaft 86 in the cash register with the main shaft 148 in the perforator unit 54.

If the data output of the cash register 52 is not to be recorded by the punching assembly 55, the selector control assembly 57 is controlled by the cam 90 so that the cam follower 230 lifts the ratchet 220 out of the recess 226 in the driven disc 218 to disconnect the main shaft 148 of the perforator unit 54 from the main shaft 86 of the cash register 52. Thus, even though data is supplied to the selector assembly 124 by the cash register 52, the punching assembly 55 is not actuated.

When the data supplied to the selector assembly 124 by the cash register 52 is to be recorded on the tape 65 by the punching assembly 55, the selector control assembly 57 is shifted to an ineffective setting by the cam 90 so that the ratchet 220 is not engaged by the cam follower 230, and the main shaft 86 of the cash register 52 is connected to the main shaft 148 of the perforating unit 54. During each operation of the cash register 52, the main shaft 86 of the register rotates through one complete revolution and rotates the main shaft 148 of the perforator unit 54 through a corresponding complete revolution.

During the initial rotation of the main shaft 148 in a clockwise direction (FIGS. 16–18), the cam 364 engages the roller 382 on the slide 362 to move the slide 362 to the right. This releases the detent means 412 and rotates the shaft 358 to feed a selected length of blank tape 65 to the punching assembly 55. The detent means 412 is then rendered effective to lock the wheel 334.

The continued rotation of the main shaft 148 in a counterclockwise direction (FIGS. 14 and 15) moves the roller 164 into engagement with the cam surface 160 of the link 152 to rotate the link counterclockwise about the shaft 156. This rotation of the drive link 152 applies a turning torque through the arm 154 to the shafts 172 and 174. These shafts are prevented from rotating about their own axes due to the engagement of the gears 178 with the rack gears 180 on the locked U-shaped element 182. Thus, the gears 178 pivot along the rack gear 180 to move the shafts 172 and 174 to the left (FIG. 7).

This movement of the actuating shafts 172 and 174 moves the U-shaped element 120 toward the code disc units 124 from the normal position illustrated in FIG. 7 to the punching position illustrated in FIG. 9. The code disc assemblies 124 block movement to the left (FIG. 9) of certain of the punch elements 92 so that these elements punch the tape 65 in the opening 104. One of the projections 130 on the code discs 126 blocks the feed hole punch element 92a during each punching operation so that feed holes are punched in the tape during each punching operation.

The continuing rotation of the main shaft 148 causes the pin 410 to engage the cam surface 408 on the Y-shaped member 398 to return the tape feeding mechanism 356 to its normal position. Moreover, the roller 158 is engaged by the lobe 188 of the cam 150 to rotate the drive link 152 clockwise about the shaft 156 to move the U-shaped member 120 away from the code disc assemblies 124 (FIG. 9) to the normal position illustrated in FIG. 7.

This operation of the data handling or processing apparatus 50 continues in the manner described above during which data items set up by the cash register 52 are selectively recorded or not recorded on the tape 65 by the punching assembly 55. When the roll of punched tape 65 is to be removed from the apparatus 50, the manually actuated assembly 59 can be operated to record the fixed data items at the end of the punched portion of this tape. The punched roll can be easily removed from the apparatus 50 by removing the front reel disc 352.

Although the present invention has been described with reference to a single embodiment thereof, it should be understood that numerous other modifications and embodiments can be devised by those skilled in the art that fall within the spirit and scope of the principles of this invention.

What is claimed as new and desired to be secured by Letters Patent of the United States is:

1. A data handling apparatus comprising an accounting machine including both a first drive means and a plurality of differentially settable elements adjustable to different data representing positions, a plurality of punches, first means actuated by said first drive means for operating said plurality of punches in accordance with the positions of said differentially settable elements, and second means including second drive means for selectively actuating punches in the same plurality thereof as the first means.

2. A data handling apparatus comprising a plurality of punch elements, means for supporting a record member adjacent said punch elements, a cash register including both first control means for selecting certain ones of said punch elements in accordance with a data entry set up in said cash register and drive means for operating said selected punch elements to record said data entry on said record, and manually actuated means for operating punch elements in the same group of punch elements selectable by the first control means to record a data entry on said record member, said manually actuated means including means for rendering said drive means in said cash register ineffective to operate said punch elements.

3. A data handling apparatus comprising a plurality of punch elements, means for supporting a record member adjacent said punch elements, a cash register including both first control means for selecting certain ones of said punch elements in accordance with a data entry set up in said cash register and drive means for operating said selected punch elements to record data entry on said record member, manually actuated means for operating punch elements in the same group of punch elements selectable by the first control means to record a data entry on said record member, and means controlled by at least one of said cash register and said manually actuated means for preventing both said drive means and said manually actuated means from operating said punch elements.

4. A punching apparatus comprising a plurality of punch elements, means for supporting a record member adjacent said punch elements, first selector means disposed adjacent said punch elements for actuating said punch elements to record data on said record member, second selector means disposed adjacent said punch elements for actuating said punch elements to record data on said record member, and control means for producing different amounts of differential movement between said first and second selector means and said punch elements so that a selected one of said first and second selector means actuates said punch elements.

5. The punching apparatus set forth in claim 4 including movable means for carrying said punch elements, and in which said control means includes detent means for engaging said movable means to limit the movement thereof.

6. A punching apparatus comprising a plurality of punch elements, means for supporting a record member adjacent said punch elements, a first mechanism including a first movable member for moving said punch elements to punch a data entry in said record member, a second mechanism including a second movable member for moving said punch elements to punch a data entry in said record member, a control link shiftable to at least two spaced positions to block movement of one or the other of said first and second movable members, and control means for shifting the position of said control link to render a selected one of said first and second mechanisms effective to operate said punch elements.

7. A punching apparatus comprising a plurality of punch elements, means for positioning a record member adjacent said punch elements, first selector means for selectively actuating said punch elements to record data on said record member, second selector means for actuating said punch elements to record data on said record member, and control means for producing relative movement of a first length between said punch elements and said first selector means so that said first selector means operate said punch elements and for producing relative movement between said punch elements and said second selector means of a second length different than said first length so that said second selector means operates said punch elements.

8. A perforating mechanism comprising a plurality of punch elements, means for guiding a record member for movement adjacent said punch elements, a first control means including a first mechanism for moving said plurality of punch elements in a first direction to actuate selected ones of said punch elements to perforate said record member, and second control means including a second mechanism for moving selected ones of said punch elements in a second direction opposite to said first direction for actuating said punch elements to perforate said record member.

9. A perforating mechanism comprising a plurality of punch elements, means for positioning a record member adjacent said punch elements, adjustable fixed position selector means for actuating selected ones of said punch elements, first control means for moving said punch elements toward said selector means to operate said punch elements to perforate said record member, and second control means for operating said punch elements including means for restraining movement of said punch elements toward said selector means and means movable toward said punch elements for operating said punch elements to perforate said record member.

10. A punching apparatus comprising a plurality of punch elements, means for supporting a record member adjacent said punch elements, first selector means for actuating said punch elements to record data on said record member, first control means for moving said punch elements toward said first selector means so that said punch elements are operated by said first selector means, second selector means for operating said punch elements to record data on said record member, and second control means for moving said second selector means toward said punch elements to operate said punch elements.

11. The punching apparatus set forth in claim 10 in which said first selector means includes a plurality of control elements movable about a common axis to different data representing positions.

12. The punching apparatus set forth in claim 10 in which said second selector means includes a movably mounted plate.

13. A punching apparatus comprising a plurality of punch elements, means for supporting a record medium adjacent said punch elements, first selector means engageable with first portions on said punch elements to actuate said punch elements to record data on said record member, second selector means engageable with second portions on said punch elements spaced from said first portions for actuating said punch elements to record data on said record member, and control means for rendering a selected one of said first and second selector means effective to operate said punch elements.

14. A punching apparatus comprising a plurality of punch elements having enlarged portions thereon, means for supporting a record member adjacent one end of said punch elements, selector means disposed adjacent said punch elements spaced from said record member for actuating said punch elements to record data on said record member, a control member disposed between said record member and said selector means and including a plurality of openings through which said punch elements pass, first control means for producing relative movement between said selector means and said punch elements so that said selector means operates said punch elements, and second control means for producing relative movement between said punch elements and said control member so that said control member selectively engages said enlarged portions to actuate said punch elements.

15. The punching apparatus set forth in claim 14 in which said first control means includes a mechanism for moving said punch elements toward said selector means and in which said second control means includes a mechanism for moving said control member toward said record member.

16. A punching apparatus comprising a row of punch elements, some of said punch elements having head portions offset to one side of a plane passing through said punch elements and others of said punch elements having head portions offset to the other side of said plane, and a control means for selectively operating said punch elements including a member rotatable about an axis perpendicular to said plane and having two axially spaced coded peripheral portions aligned with the offset head portions on said punch elements.

17. The punching apparatus set forth in claim 16 in which said two coded peripheral portions are divided into different sectors each providing a coded representation of a different data item and in which the sectors on the two coded peripheral portions representing the same data item are spaced angularly from each other about said axis.

18. A coded selector for operating punch elements which comprises a member mounted for rotation about an axis, and a pair of axially spaced peripheral portions on said member, each of said peripheral portions being divided in distinct sectors each providing a part of a coded representation of a different data item, said two peripheral portions being positioned on said member with the sectors on the peripheral portions that represent like data items spaced angularly from each other about the axis of said member to positions in which the sectors on the two peripheral portions representing like data items do not overlap.

19. A punching apparatus for use with an accounting machine comprising a plurality of punch elements, a plurality of differential means controlled by said accounting means for operating said punch elements to record data items supplied by the cash register on a record, record feeding means for moving the record relative to the punch elements, and manually actuated means for operating the record feeding means to advance the record and for selecting and operating a group of the punch elements to record a predetermined item of data on the record.

20. A punching apparatus for use with an accounting machine having a drive means comprising a punching assembly including a plurality of punch elements, a plurality of differential means set by the accounting machine to select different combinations of the punch elements for operation in accordance with data items established by the accounting machine, record feeding means for moving a record relative to the punching assembly, actuating means actuated by the drive means for operating the punching assembly and the record feeding means to record spaced entries on the record in accordance with the data entries supplied by the accounting machine, manually actuated means for operating said record feeding means to advance the record relative to the punching assembly, and means controlled by said manually actuated means for selecting and operating a group of punch elements in said punching assembly to record a predetermined entry on the record when the manually actuated means is operated.

21. The punching apparatus set forth in claim 20 including interlock means for preventing concurrent operation of said actuating means and said manually actuated means.

22. In a punching apparatus, a member mounted for rotation about an axis, a first coded element secured to said member at one side thereof, a second coded element secured to said member at the other side thereof, the peripheral portions of said first and second coded elements having coded patterns of projections and recesses, the coded pattern on each of the elements being divided into sectors each representing a part of the code for a given data item, said elements being so positioned relative to each other that the sectors on the first and second elements representing parts of the code for the same data item are spaced angularly from each other about said axis.

23. The punching apparatus set forth in claim 22 including a row of punch elements for recording a coded entry of a data item, said row of punch elements being generally aligned with said member and means offset to opposite sides of said member for sensing the coded patterns on the first and second elements to control the selective operation of the row of punch elements.

24. A punching apparatus comprising a plurality of punch means, first selector means for selecting a group of said punch means for operation to record a first data item, second selector means for selecting a group of said punch means for operation to record a second data item, and control means for selectively producing oppositely directed relative movement between said plurality of punch means and the first and second selector means to operate said punch elements to record either the first or scond data item.

25. A punching apparatus comprisingly a plurality of punch means having spaced first and second portions, first selector means disposed adjacent the first portions on the punch means for conditioning the punch means to record a first data item, second selector means disposed adjacent the second portions on the punch means for conditioning the punch means to record a second data item, record receiving means for positioning a record adjacent the plurality of punch means, and control means for producing relative movement between the plurality of punch means and the record and for rendering a selected one of the first and second selector means effective to record one of the first or second data items on the record.

26. A punching apparatus comprising a plurality of punching means, selector means disposed adjacent the plurality of punching means for concurrently conditioning the same plurality of punching means to record two distinct data items, and control means for producing different types of relative movement between the selector means and the plurality of punching means to record a selected one of the two distinct data items.

27. A punching apparatus comprising a plurality of punch elements, means for positioning a record member adjacent said punch elements, first movably mounted means operable through a path of movement to move selected punch elements and the record member relative to each other to punch data in the record member, second movably mounted means operable through a path of movement to move selected punch elements and the record member relative to each other to punch data in the record member, control means for selectively restraining movement of one or the other of said first and second movably mounted means, and drive means for actuating said first and second movably mounted means so that one or the other of said movably mounted means operates said punch elements under the control of said control means.

References Cited in the file of this patent

UNITED STATES PATENTS

| | | |
|---|---|---|
| 2,176,130 | Green | Oct. 17, 1939 |
| 2,306,894 | Nelson | Dec. 29, 1942 |
| 2,397,112 | Hueber | Mar. 26, 1946 |
| 2,664,951 | Loudon | Jan. 4, 1954 |
| 2,696,982 | Metzner | Dec. 14, 1954 |
| 2,723,116 | Abbott | Nov. 8, 1955 |
| 2,858,889 | Kent | Nov. 4, 1958 |
| 2,945,538 | Little et al. | July 19, 1960 |
| 2,950,758 | Englund et al. | Aug. 30, 1960 |
| 2,970,752 | Wittenmyer | Feb. 7, 1961 |
| 3,017,076 | Braun | Jan. 16, 1962 |